United States Patent
Goldsteen et al.

(10) Patent No.: US 10,831,869 B2
(45) Date of Patent: Nov. 10, 2020

(54) METHOD FOR WATERMARKING THROUGH FORMAT PRESERVING ENCRYPTION

(71) Applicant: International Business Machines Corporation, Armonk, NY (US)

(72) Inventors: Abigail Goldsteen, Haifa (IL); Lev Greenberg, Haifa (IL); Ariel Farkash, Shimshit (IL); Boris Rozenberg, Ramat Gan (IL); Omri Soceanu, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 16/025,001

(22) Filed: Jul. 2, 2018

(65) Prior Publication Data

US 2020/0004935 A1  Jan. 2, 2020

(51) Int. Cl.
*G06F 21/16* (2013.01)
*G06F 21/60* (2013.01)
*G06N 20/00* (2019.01)

(52) U.S. Cl.
CPC ............ *G06F 21/16* (2013.01); *G06F 21/602* (2013.01); *G06N 20/00* (2019.01)

(58) Field of Classification Search
CPC .............................. G06F 21/16; G06F 21/602
See application file for complete search history.

(56) References Cited

U.S. PATENT DOCUMENTS

| | | | |
|---|---|---|---|
| 7,068,787 B1 * | 6/2006 | Ta | G06F 21/10 380/200 |
| 7,111,167 B1 * | 9/2006 | Yeung | G06F 21/16 380/30 |
| 7,302,079 B2 * | 11/2007 | Kesal | G06F 21/16 382/100 |
| 8,144,923 B2 * | 3/2012 | Zhao | G06T 1/0035 382/100 |
| 8,208,627 B2 * | 6/2012 | Pauker | H04L 9/0625 380/28 |
| 8,543,835 B2 * | 9/2013 | Michiels | H04L 9/06 713/189 |
| 8,869,292 B2 * | 10/2014 | Eluard | G09C 5/00 380/259 |
| 8,949,625 B2 | 2/2015 | Spies et al. | |
| 9,197,609 B2 | 11/2015 | Luo | |

(Continued)

FOREIGN PATENT DOCUMENTS

| | | |
|---|---|---|
| CN | 105701758 | 6/2016 |
| CN | 107168998 | 9/2017 |

OTHER PUBLICATIONS

Itier et al., "Cryptanalysis Aspects in 3-D Watermarking", 2014 IEEE International Conference on Image Processing (ICIP), 2014, pp. 4772-4776.

*Primary Examiner* — Saleh Najjar
*Assistant Examiner* — Feliciano S Mejia
(74) *Attorney, Agent, or Firm* — Gregory J. Kirsch

(57) ABSTRACT

Embodiments of the present systems and methods may provide data watermarking without reliance on error-tolerant fields, thereby providing for the incorporation of watermarks in data that was not considered suitable for watermarking.

For example, in an embodiment, a computer-implemented method for watermarking data may comprise inserting watermark data into a field that requires format-preserving encryption.

19 Claims, 6 Drawing Sheets

(56) References Cited

U.S. PATENT DOCUMENTS

| | | | |
|---|---|---|---|
| 9,313,023 B1* | 4/2016 | Murray | H04L 9/0618 |
| 10,229,278 B2* | 3/2019 | Boucqueau | G09C 5/00 |
| 10,265,994 B2* | 4/2019 | Kerkar | B42D 25/29 |
| 10,467,420 B2* | 11/2019 | Burnett | H04L 9/0816 |
| 2013/0198525 A1 | 8/2013 | Spies et al. | |
| 2014/0119538 A1* | 5/2014 | Maetz | G09C 5/00 |
| | | | 380/28 |
| 2014/0229742 A1* | 8/2014 | Heen | G06F 21/602 |
| | | | 713/189 |
| 2015/0200782 A1* | 7/2015 | Horne | H04K 1/00 |
| | | | 713/189 |
| 2016/0019396 A1* | 1/2016 | Davis | H04L 63/0807 |
| | | | 713/193 |
| 2017/0148451 A1 | 5/2017 | Megias Jimenez | |
| 2019/0087927 A1* | 3/2019 | Dewitt | G06F 21/84 |
| 2019/0180325 A1* | 6/2019 | Carrasco | G06F 16/9535 |

* cited by examiner

METHOD FOR WATERMARKING THROUGH FORMAT PRESERVING ENCRYPTION

BACKGROUND

The present invention relates to techniques for data watermarking using format preserving encryption.

Watermarking involves the covert embedding of information within data. A digital watermark is information that may be covertly embedded in error or noise-tolerant signals or data, such as audio, video or image data. For example, digital watermarking may be used to identify ownership of the copyright of a signal or data. As digital watermarking involves modifying a signal or dataset, error or noise-tolerance mitigates the negative effects of such modification on the uses of the signal or data.

Datasets with few, if any, error-tolerant fields present a challenge for watermarking systems due to decreased channel capacity. In such situations, there is little space in which the watermark may be embedded. Existing data watermarking techniques rely on the existence of error-tolerable fields for embedding the watermark into the data. This means that in some cases the watermark capacity will be too small to contain a large quantity of information, or alternatively, will reduce the amount or error correction and thus decrease the robustness of the watermark.

A need arises for techniques that may provide data watermarking without reliance on error-tolerant fields, thereby providing for the incorporation of watermarks in data that was not considered suitable for watermarking.

SUMMARY

Embodiments of the present systems and methods may provide data watermarking without reliance on error-tolerant fields, thereby providing for the incorporation of watermarks in data that was not considered suitable for watermarking.

For example, in an embodiment, a computer-implemented method for watermarking data may comprise inserting watermark data into a field that requires format-preserving encryption.

In embodiments, the inserting may comprise encrypting the field that requires format-preserving encryption so as to preserve constraints over data format and inserting the watermark data into the field that requires format-preserving encryption by mapping the watermark data to at least one subset of an encrypted dataset. The at least one subset may be identified as being unused by the dataset. When at least one least one subset that has been identified as being unused by the dataset is found to actually be in use by the dataset, mapping the watermark data to a different subset that has been identified as being unused by the dataset. The at least one subset may be identified by finding properties of the dataset that allow for additional information insertion so as to transforming a data domain of the dataset from a sparse representation to a denser representation. The inserting may comprise encoding each value of watermark data in the at least one subset or in a value of the at least one subset. Inserting the watermark may not create errors and the insertion may be reversible. The available subsets may be found by mapping a plurality of values from the input dataset to encoded values using mapping rules, mapping tables, or both, identifying groups of encoded data that are in use using machine learning or expert knowledge, and finding available subsets that are not included in the identified groups of encoded data.

In an embodiment, a system for watermarking data may comprise a processor, memory accessible by the processor, and computer program instructions stored in the memory and executable by the processor to perform inserting watermark data into a format-preserving encrypted field.

In an embodiment, a computer program product for watermarking data may comprise a non-transitory computer readable storage having program instructions embodied therewith, the program instructions executable by a computer, to cause the computer to perform a method comprising inserting watermark data into a format-preserving encrypted field.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide data watermarking without reliance on error-tolerant fields, thereby providing for the incorporation of watermarks in data that was not considered suitable for watermarking.

Embodiments of the present systems and methods may use format preserving encryption (FPE), which is a method used for encrypting data when it is necessary to maintain the data's format for reasons such as validation. In comparison to standard encryption, format preserving encryption has the added benefit of encrypted data being indistinguishable from the original data. Embodiments of the present systems and methods may provide a capacity increase for watermarking in datasets that currently have FPE fields by integrating the watermarking process with format preserving encryption, in a lossless manner.

Integrating watermarking with format preserving encryption methods may provide for the incorporation of watermarks in data that were not currently considered suitable for watermarking, and may provide an increase in overall watermarking capacity. In embodiments, this integration may be provided for reversible watermarking methods. Such reversible watermarking methods may have certain prerequisites regarding bitwise/inter-element properties that are commonly met in datasets such as natural images, signals, email addresses, passport number lists, etc. Otherwise, in some cases, depending on the plain data characteristics, these prerequisites can be met through a pre-watermarking process. Pre-processing, which may be done using expert knowledge or machine learning techniques, may transform data properties and make applicable over the original data certain watermarking techniques that were not previously applicable.

Figure 1:
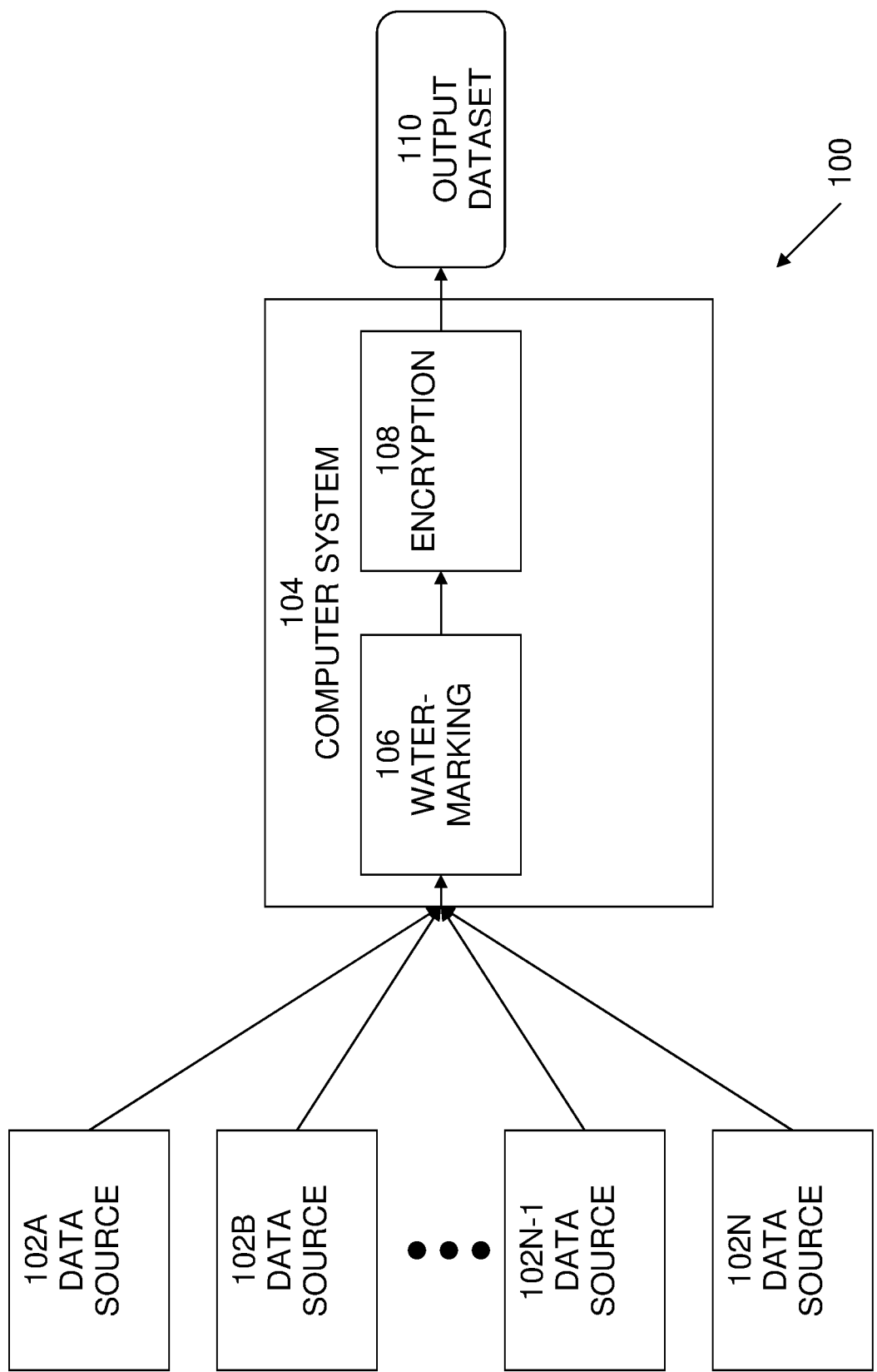
FIG. 1 illustrates a system in which described embodiments may be implemented.

An exemplary block diagram of a system 100, in which embodiments of the present systems and methods may be implemented is shown in FIG. 1. In this example, system 100 includes data sources 102A-N and computer system 104. Data sources 102A-N may include sources of data such as the Internet, computer systems, other computing devices, such as smartphone, tablets, etc., or data sources such as files present on or transferred to, computer system 104. Computer system 104 may be implemented using one or more programmed general-purpose computer systems, such as embedded processors, systems on a chip, personal computers, workstations, server systems, and minicomputers or mainframe computers, or in distributed, networked computing environments. Computer system 104 may include watermarking processing 106 and encryption processing 108. Watermarking processing 106 may perform watermarking of data in accordance with techniques disclosed herein. Likewise, encryption processing 108 may perform encryption of data in accordance with techniques disclosed herein. As result of processing performed in computer system 104, output dataset 110 may be generated.

Figure 2:
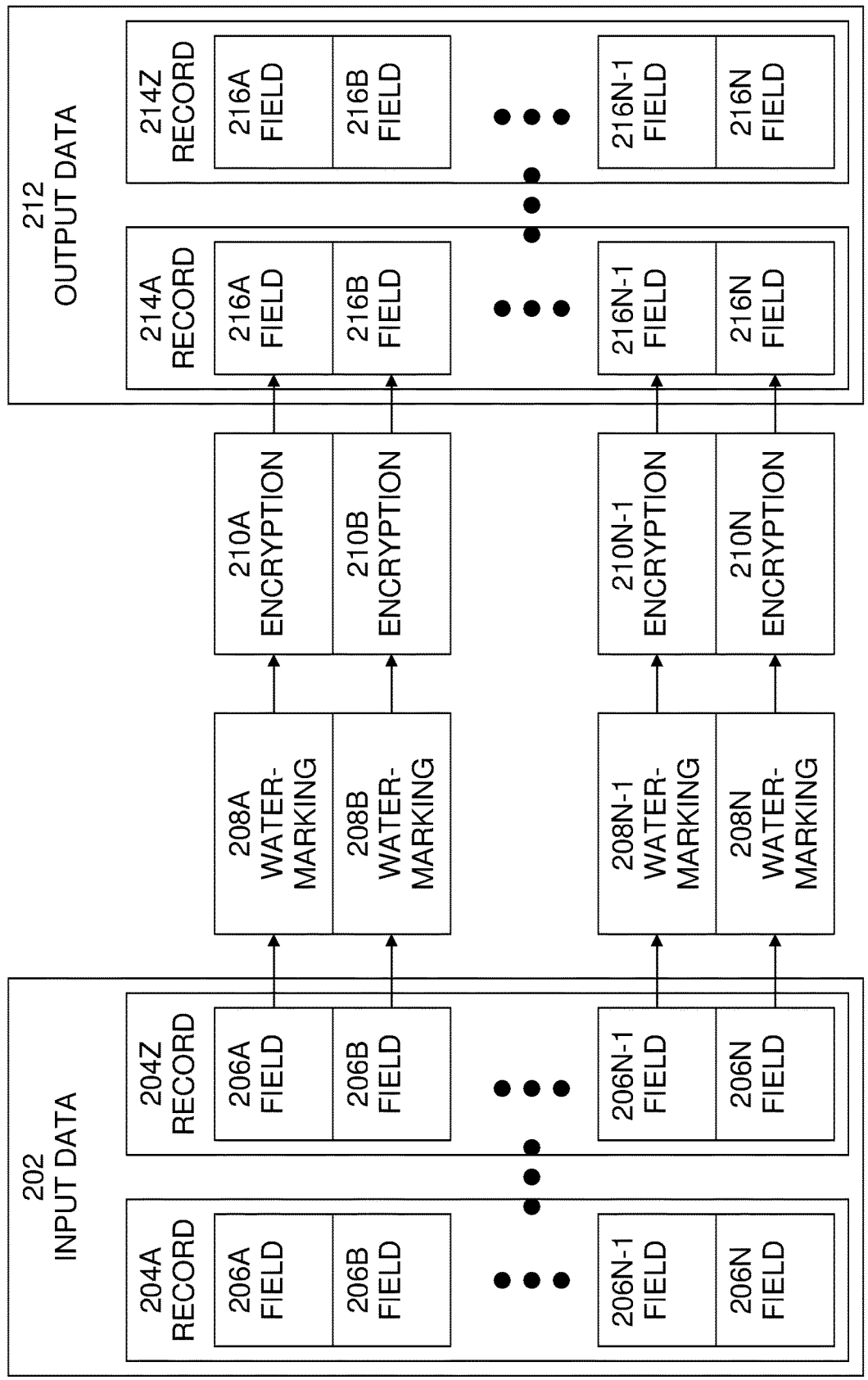
FIG. 2 is an exemplary data flow diagram of watermarking processes involved in the present embodiments.

Embodiments of the present systems and methods may incorporate a watermark into fields that were encrypted using FPE. An example of such processing is shown in FIG. 2. In this example, input data 202 may include a plurality of data records 204A-Z, each of which may include a plurality of data fields 206A-N. For example, an embodiment may leverage bitwise properties of data, such as locality within the data. For example, close records, such as 204A and 204B (not shown), position-wise within the dataset, may have close values, a correlation between the appearance of values/ digits, inter/intra-record order, etc. These properties may be found in naturally sampled data, such as images and sound data, email addresses, ordered identification number lists, etc. For high entropy data, such as already encrypted data, random data, compressed data, etc., such correlated properties may not exist. When such correlated properties do exist, watermarking processing 208A-N may be applied. As shown in FIG. 2, in embodiments, different watermarking processing 208A-N may be applied to each data field 206A-N, depending upon the contents of the data field. Watermarking processing 208A-N may begin, for example, with Text to Integer Mapping over a single record or a group of records. A reversible watermarking method, which utilizes the aforementioned properties may then be applied. At 210A-N, Integer Format Preserving Encryption (IFPE) and Integer to Text Mapping may be applied. The resulting output data 212, may include formatted and encrypted record(s) 214A-Z that also contain a watermark. In embodiments, the resulting output data 212 may be indistinguishable from an unwatermarked encrypted record due to the encryption process.

For example, with FPE, the input data domain may be the same size as the output data domain. For example, in the case of sixteen-digit credit card numbers that are encrypted using FPE, the encrypted output may also be sixteen-digit numbers in accordance with the credit card number format. Because of this one-to-one mapping (sixteen digits in, sixteen digits out), in order to insert additional information (the watermarking information), embodiments of the current techniques may identify subsets (values, regions, subsets, etc.) within the sixteen digits that are unused. These unused subsets may then be used for inserting the watermarking information. For example, for each data value of watermarking information to be inserted, at least one data value that is unused may be needed to encode each data value.

Figure 3:
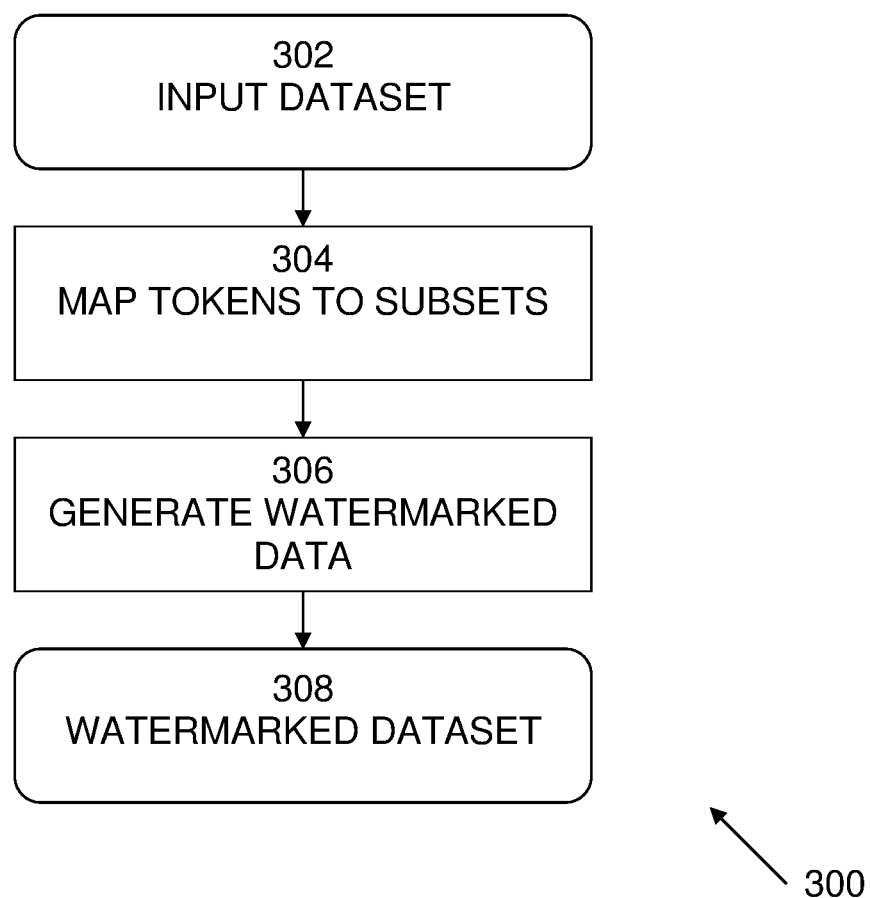
FIG. 3 is an exemplary flow diagram of preprocessing involved in the present embodiments.

In an embodiment, preprocessing may be used to obtain correlated properties. An example of such preprocessing 300 is shown in FIG. 3. Such preprocessing may, for example, be applied to sparse datasets with some patterns which can be either learned or configured. For example, the dataset and format of the dataset may be analyzed and subsets (values, regions, subsets, etc.), which are unused, may be identified. Such unused subsets may be identified by, for example, using expert knowledge or machine learning. Such subsets may occur, for example, as a result of the sparseness of the dataset or the constraints of the format, etc. For example, consider the set of sixteen-digit credit card numbers. It may be that no valid credit card numbers may begin with the four digits "0000", yet it is valid according to format restrictions. Then the subset of credit card numbers that begin with "0000" may be identified as available for use in encoding watermark information. In some instances, a subset that has been identified as unused may be found to actually be in use. That is, one or more values in the subset may be encountered during processing. In these instances, another subset may be used in place of the subset found to actually be in use.

For example, considering an input dataset 302 of N tokens which abide by a language format L, at 304, a solution (assuming that N is much smaller than the number of words in L) may be to map all tokens to 2 or more disjoint subsets of L. At 306, watermarked data may be generated by selecting a subset to represent (or encode) each data value. For example, each of the subsets may represent a watermark encoding of a different combination of bits. During the watermarking process, the proper subset may be chosen according to the watermark bits and from each subset the proper word may be chosen according to the data. Then watermarked dataset 308 may be generated. For example, given credit card numbers wherein credit card numbers that begin with "0000" have be identified as available, a watermark bit of "0" may be represented by using an unmodified credit card number, while a watermark bit of "1" may be represented by using a sixteen-digit number that otherwise meets the credit card number format, but that begins with "0000". As another example, assume a dataset including ten sixteen-digit credit card numbers. The first credit card number may be mapped to, for example, '1000000000000001', in order to encode a watermark bit of '0', and may be mapped to, for example, '1100000000000001', in order to encode a watermark bit of '1'. The second credit card number may be mapped to, for example, '1000000000000002', in order to encode a watermark bit of '0', and may be mapped to, for example, '1100000000000002', in order to encode a watermark bit of '1', and so on. Such an encoding may require a mapping table that is the size of the dataset. Using either expert knowledge or machine learning, the size of the mapping table may be reduced and replaced with a compact function that may utilize redundancy within the data. Such compact encoders may not represent each value in a one-to-one fashion. For such cases, a mapping table may be used.

Figure 4:
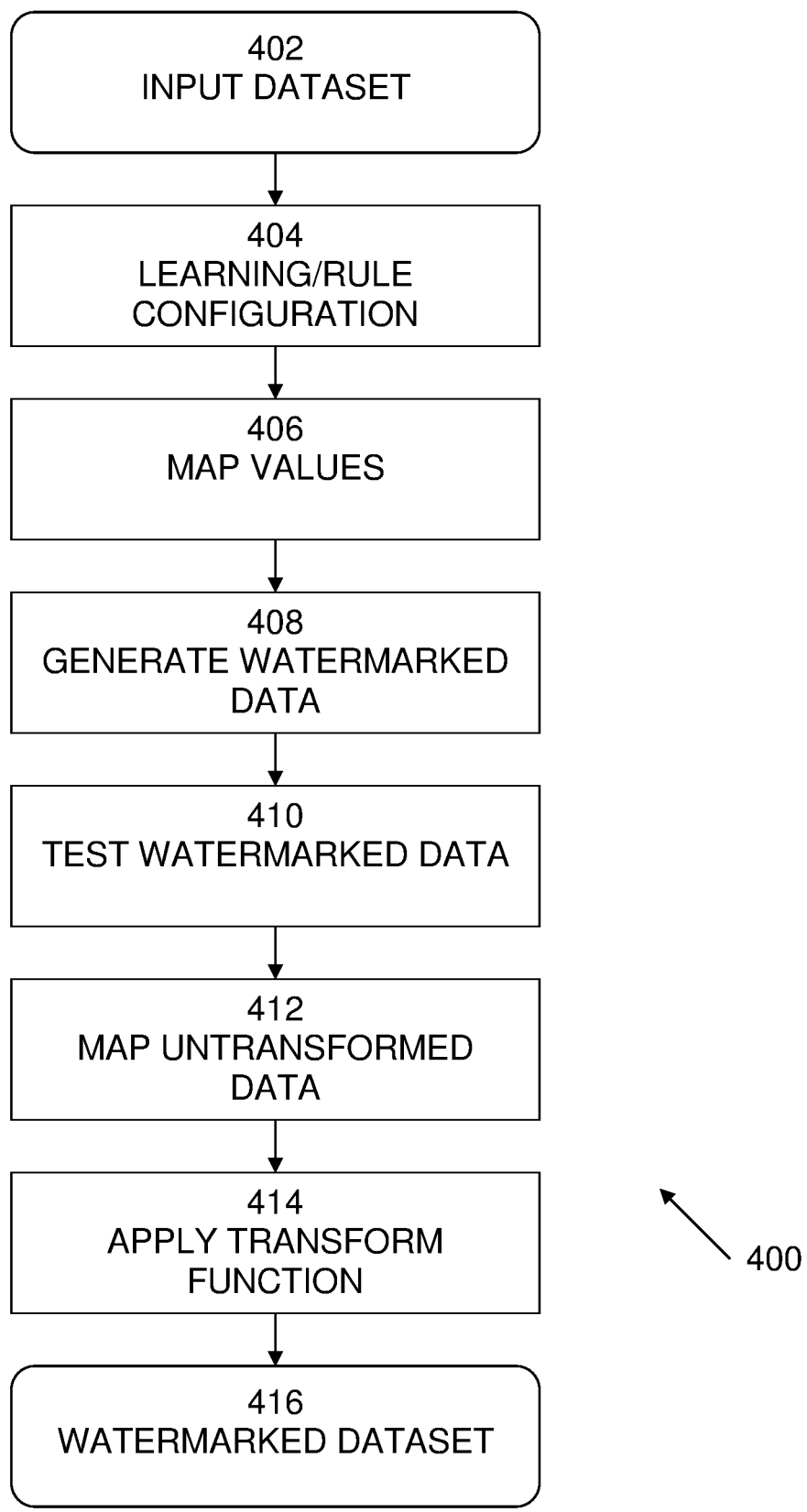
FIG. 4 is an exemplary flow diagram of watermarking and encryption processes involved in the present embodiments.

In an embodiment, an example of a watermarking and encryption process 400 is shown in FIG. 4. Process 400 processes an input dataset input dataset 402 in order to find data values/regions in the dataset that may be available to store watermarking data and to generate encoding rules and/or mapping tables to encode data to these available data values/regions. At 404, prior to the watermarking, an offline learning and/or a manual rule configuration process may be performed to construct an encoder using dataset 402 in its current state. At 406, values from input dataset 402 may be mapped to encoded values. Such a mapping may be stored, for example, in a set of mapping rules and/or one or more mapping tables. At 408, the generated mapping may be used to generate watermarked data using values from input data set 404. Machine learning may be used in order to discover underlying patterns within the data and to find data values/regions in the data that may not be used and which may be available to store watermarking data. For truly random data such it may not be possible to find such available values/regions. However for many cases the data isn't truly random. Machine learning techniques such as clustering, which may compactly describe groups of records, may be used for this process. Through clustering, rules may be learned that would otherwise be unknown or known only to experts. These learned rules may then be used to transform the data domain from a sparse representation to a dense one, based on the characteristics of the dataset, by finding available data values/regions. For example, looking at credit card numbers, there may be number prefixes that are very common, while other prefixes are never used. The detected clusters of prefixes may consequently be mapped to the values that are never used. Additionally, some watermarking methods may determine whether data is 'watermarkable', that is, if it meets certain properties, and further, may be able to determine the watermark capacity of the data. This determination may be used as a cost function for the machine learning process 404, and may be used during machine learning process 404 until the transformed data holds the desired properties. In so doing, capacity may be increased or maximized, while any memory usage threshold may not be exceeded.

At 410, after generating watermarked data 408, the watermarking process 408 may be tested to see that each value's transformation is invertible. At 412, for words which watermarking process 408 is unable to transform in a one-to-one fashion, a mapping table may be constructed to map this untransformed data. At 414, using a transform function, constructed under the limitations of the dataset and format language sizes, a bit-encoding for each word in the dataset may be defined. For example, given a watermark bit and a word from the dataset the transform function may indicate a word (in the format of language L) which represents both. In embodiments, the transform function may represent multiple watermarked bits in each word. In addition, the learning stage may, in some embodiments, be iterative and so would not require any prior data.

Figure 5:
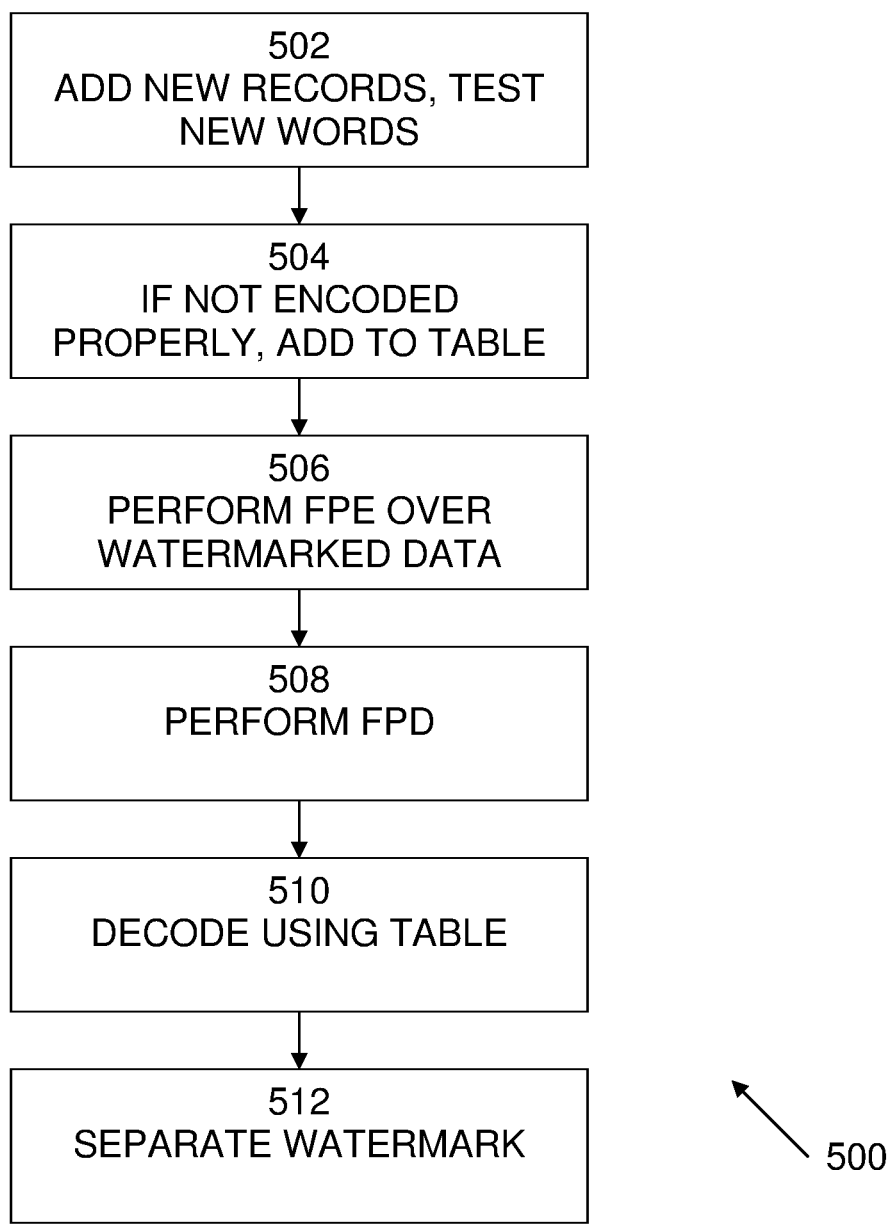
FIG. 5 is an exemplary flow diagram of watermarking and encryption process in a dynamically changing database involved in the present embodiments.

After the early-mapping stage, at 416, a new watermarked dataset 416 has been defined, which adheres to the same format as L but now may covertly encode information. In embodiments, the function that generates the watermark itself may be chosen from any known or newly developed watermarking method. Likewise, records may be inserted into the database using any known or newly developed watermarking method for relational databases. Such methods may insert a watermark into a dynamically changing database while still allowing watermark retrieval. In an embodiment, an example of a watermarking and encryption process 500 in a dynamically changing database is shown in FIG. 5. At 502, as new records are added to the database, new words may be tested using the already constructed watermarking process 408. At 504, In cases where the new words are not handled properly, these words may be added to the mapping table. At 506, format preserving encryption may be performed over the watermarked words. At 510, when the need to obtain the watermark rises, format preserving decryption may be performed by decoding the watermarked words using the table map when the word appears in the map or by using the encoder otherwise. At 512, the watermark may be separated from the original token and extracted the watermark using the watermarking function.

Figure 6:
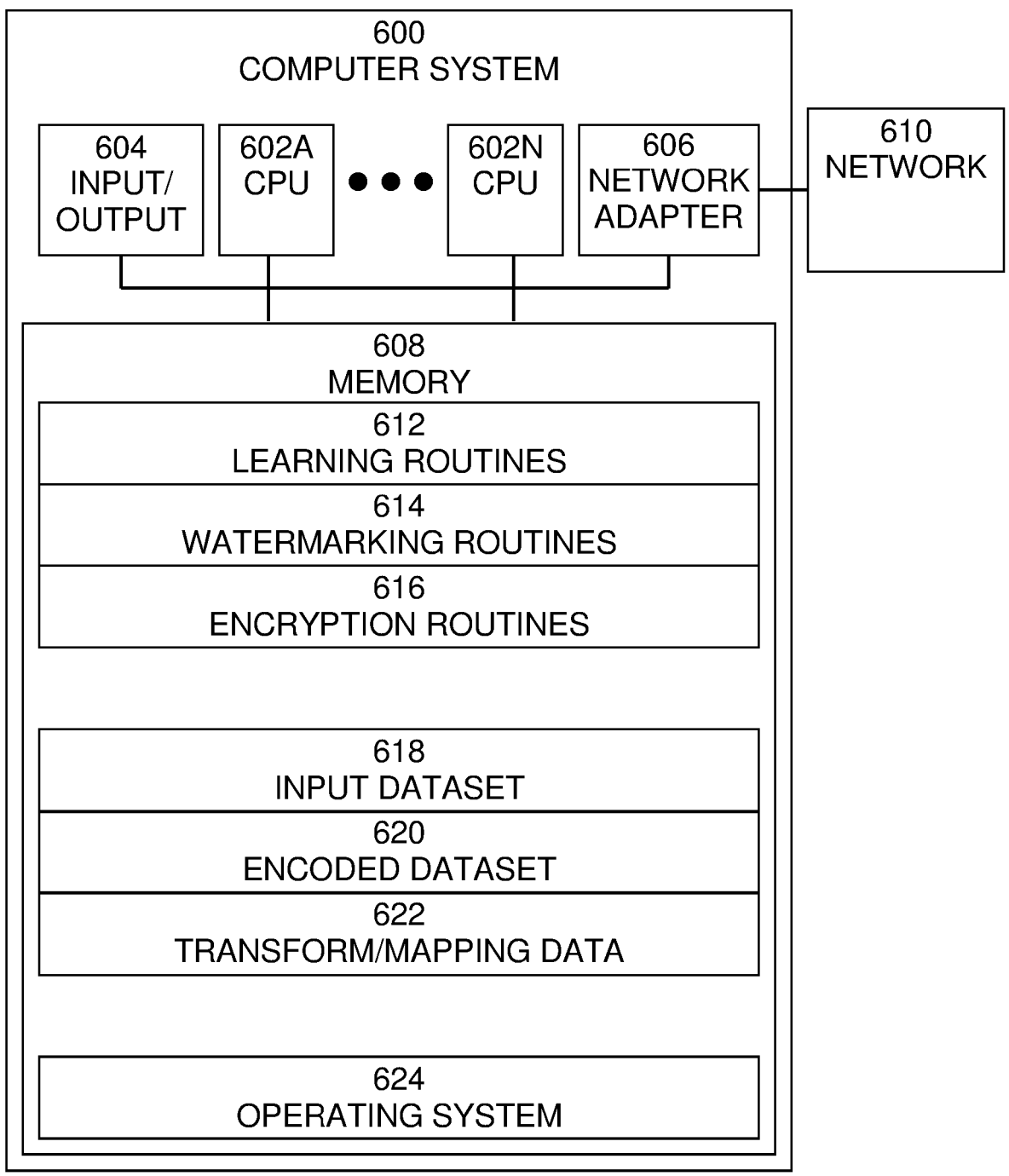
FIG. 6 is an exemplary block diagram of a computer system in which processes involved in the embodiments described herein may be implemented.

An exemplary block diagram of a computer system 602, in which processes involved in the embodiments described herein may be implemented, is shown in FIG. 6. Computer system 602 may be implemented using one or more programmed general-purpose computer systems, such as embedded processors, systems on a chip, personal computers, workstations, server systems, and minicomputers or mainframe computers, or in distributed, networked computing environments. Computer system 602 may include one or more processors (CPUs) 602A-602N, input/output circuitry 604, network adapter 606, and memory 608. CPUs 602A-602N execute program instructions in order to carry out the functions of the present communications systems and methods. Typically, CPUs 602A-602N are one or more microprocessors, such as an INTEL CORE® processor. FIG. 6 illustrates an embodiment in which computer system 602 is implemented as a single multi-processor computer system, in which multiple processors 602A-602N share system resources, such as memory 608, input/output circuitry 604, and network adapter 606. However, the present communications systems and methods also include embodiments in which computer system 602 is implemented as a plurality of networked computer systems, which may be single-processor computer systems, multi-processor computer systems, or a mix thereof.

Input/output circuitry 604 provides the capability to input data to, or output data from, computer system 602. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 606 interfaces device 600 with a network 610. Network 610 may be any public or proprietary LAN or WAN, including, but not limited to the Internet.

Memory 608 stores program instructions that are executed by, and data that are used and processed by, CPU 602 to perform the functions of computer system 602. Memory 608 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 608 may vary depending upon the function that computer system 602 is programmed to perform. In the example shown in FIG. 6, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In embodiments, at least a portion of the software shown in FIG. 6 may be implemented on a current leader server. Likewise, in embodiments, at least a portion of the software shown in FIG. 6 may be implemented on a computer system other than the current leader server.

In the example shown in FIG. 6, memory 608 may include learning routines 612, watermarking routines 614, encryption routines 616, input dataset 618, encoded dataset 620, transform/mapping data 622, and operating system 620. Learning routines 612 may include software routines to perform pre-computation processing tasks, such as implementing rule generator 206, clauses extraction 222, compilation 224, and evaluation 226, shown in FIG. 2. Runtime routines 614 may include software routines to perform runtime processing tasks, such as target identification 246, request rewriting 248, runtime clause evaluation 250, request reduction 252, and request execution 254, shown in FIG. 2. Data 616 may include data, such as may be stored in data lake 228, such as target data 230, context data 232, consent data 234, compiled Uber-rules 236, and evaluated clauses 238, shown in FIG. 2. Data 618 may include data such as access properties 210, policies 212, data schema 214, data targets 216, queries 240, rule engine rules 242, access rules 244, and compliant data 256, shown in FIG. 2. Operating system 620 may provide overall system functionality.

As shown in FIG. 6, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method for watermarking data, the method comprising:
    inserting watermark data into a field that requires format-preserving encryption, comprising:
    encrypting the field that requires format-preserving encryption so as to preserve constraints over data format; and
    inserting the watermark data into the field that requires format-preserving encryption by mapping the watermark data to at least one subset of an encrypted dataset;
    wherein the at least one subset of the encrypted dataset has been identified as being unused by the dataset by analyzing the dataset and a format of the dataset to learn patterns of unused subsets based on sparseness of the dataset or constraints of the format.

2. The method of claim 1, further comprising:
    when at least one least one subset that has been identified as being unused by the dataset is found to actually be in use by the dataset, mapping the watermark data to a different subset that has been identified as being unused by the dataset.

3. The method of claim 2, wherein the at least one subset has been identified by finding properties of the dataset that allow for additional information insertion so as to transforming a data domain of the dataset from a sparse representation to a denser representation.

4. The method of claim 3 wherein the inserting comprises:
    encoding each value of watermark data in the at least one subset or in a value of the at least one subset.

5. The method of claim 4, wherein inserting the watermark does not create errors and the insertion is reversible.

6. The method of claim 1, wherein the available subsets are found by:
    mapping a plurality of values from the input dataset to encoded values using mapping rules, mapping tables, or both;
    identifying groups of encoded data that are in use using machine learning or expert knowledge; and
    finding available subsets that are not included in the identified groups of encoded data.

7. A system for watermarking data, the system comprising a processor, memory accessible by the processor, and computer program instructions stored in the memory and executable by the processor to perform:
    inserting watermark data into a field that requires format-preserving encryption, comprising:
    encrypting the field that requires format-preserving encryption so as to preserve constraints over data format; and
    inserting the watermark data into the field that requires format-preserving encryption by mapping the watermark data to at least one subset of an encrypted dataset;
    wherein the at least one subset of the encrypted dataset has been identified as being unused by the dataset by analyzing the dataset and a format of the dataset to learn patterns of unused subsets based on sparseness of the dataset or constraints of the format.

8. The system of claim 7, further comprising:
    when at least one least one subset that has been identified as being unused by the dataset is found to actually be in use by the dataset, mapping the watermark data to a different subset that has been identified as being unused by the dataset.

9. The system of claim 8, wherein the at least one subset has been identified by finding properties of the dataset that allow for additional information insertion so as to transforming a data domain of the dataset from a sparse representation to a denser representation.

10. The system of claim 9, wherein the inserting comprises:

encoding each value of watermark data in the at least one subset or in a value of the at least one subset.

11. The system of claim 10, wherein inserting the watermark does not create errors and the insertion is reversible.

12. The system of claim 7, wherein the available subsets are found by:
mapping a plurality of values from the input dataset to encoded values using mapping rules, mapping tables, or both;
identifying groups of encoded data that are in use using machine learning or expert knowledge; and
finding available subsets that are not included in the identified groups of encoded data.

13. A computer program product for watermarking data, the computer program product comprising a non-transitory computer readable storage having program instructions embodied therewith, the program instructions executable by a computer, to cause the computer to perform a method comprising:
inserting watermark data into a field that requires format-preserving encryption, comprising:
encrypting the field that requires format-preserving encryption so as to preserve constraints over data format; and
inserting the watermark data into the field that requires format-preserving encryption by mapping the watermark data to at least one subset of an encrypted dataset;
wherein the at least one subset of the encrypted dataset has been identified as being unused by the dataset by analyzing the dataset and a format of the dataset to learn patterns of unused subsets based on sparseness of the dataset or constraints of the format.

14. The computer program product of claim 13, further comprising:
when at least one least one subset that has been identified as being unused by the dataset is found to actually be in use by the dataset, mapping the watermark data to a different subset that has been identified as being unused by the dataset.

15. The computer program product of claim 14, wherein the at least one subset has been identified by finding properties of the dataset that allow for additional information insertion so as to transforming a data domain of the dataset from a sparse representation to a denser representation.

16. The computer program product of claim 15, wherein the inserting comprises:
encoding each value of watermark data in the at least one subset or in a value of the at least one subset.

17. The computer program product of claim 15, wherein security of the encryption is not degraded.

18. The computer program product of claim 16, wherein inserting the watermark does not create errors and the insertion is reversible.

19. The computer program product of claim 13, wherein the available subsets are found by:
mapping a plurality of values from the input dataset to encoded values using mapping rules, mapping tables, or both;
identifying groups of encoded data that are in use using machine learning or expert knowledge; and
finding available subsets that are not included in the identified groups of encoded data.

* * * * *